March 2, 1948.  W. O. TAYLOR  2,437,176
UNDERGROUND CUTTER FOR TREES
Filed Feb. 1, 1946  2 Sheets-Sheet 1
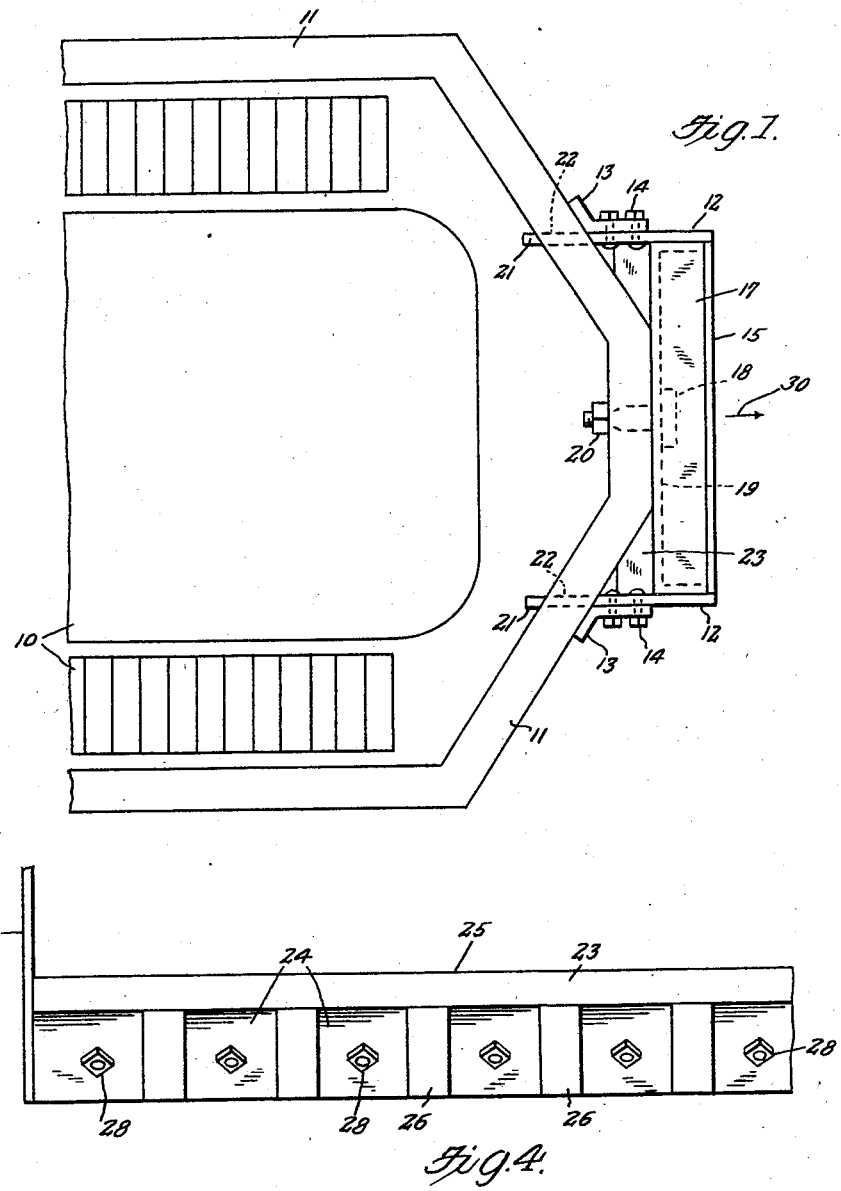
Inventor
Willard O. Taylor.
By Clarence A. O'Brien
and Harvey B. Jacobson
Attorneys March 2, 1948.  W. O. TAYLOR  2,437,176
UNDERGROUND CUTTER FOR TREES
Filed Feb. 1, 1946  2 Sheets-Sheet 2
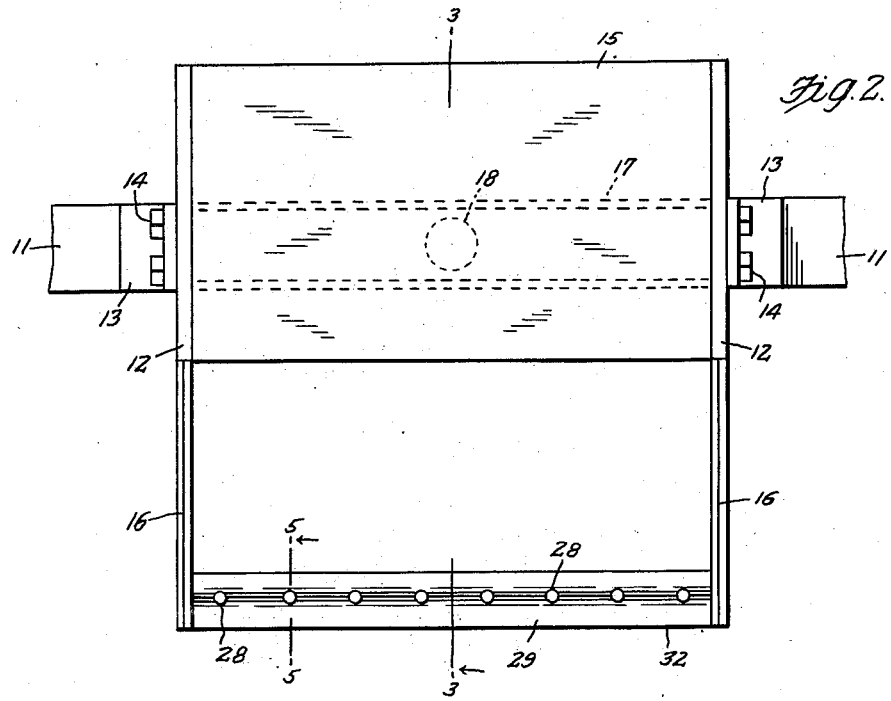
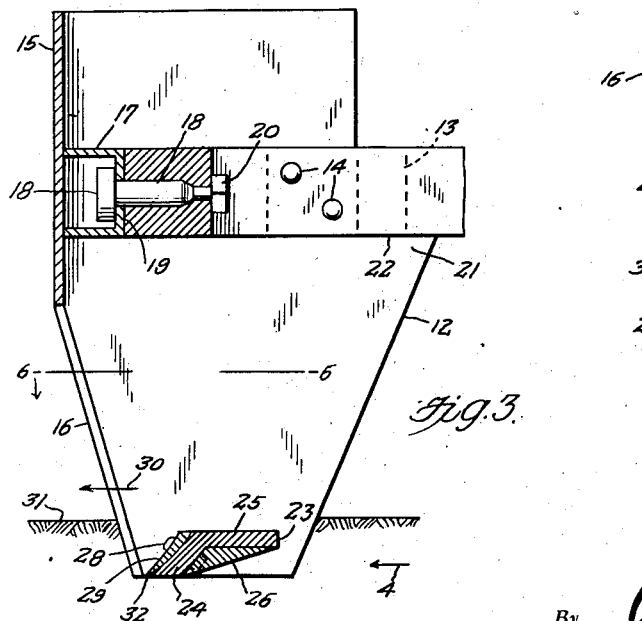
Inventor
Willard O. Taylor.
By Clarence A. O'Brien
and Harvey B. Jacobson
Attorneys Patented Mar. 2, 1948

2,437,176

UNITED STATES PATENT OFFICE 2,437,176

UNDERGROUND CUTTER FOR TREES

Willard O. Taylor, Ranger, Tex.

Application February 1, 1946, Serial No. 644,881

3 Claims. (Cl. 37—2)

This invention relates to new and useful improvements and structural refinements in cutters for trees and the principal object of the invention is to provide a device of the character herein described which is particularly adapted for attachment to tractors, bulldozers and the like, in order that mesquite trees and shinnery brush may be quickly and conveniently removed thereby.

A further object of the invention is to provide a cutter which will sever the trees below the surface of the ground, thereby preventing further growth and sprouting of the roots.

Another object of the invention is to provide a cutter which, by virtue of the characteristics outlined in the preceding paragraph, will leave the ground level relatively undisturbed and free from tree stumps, holes and the like, such as may endanger the safety of cattle which may be subsequently pastured thereon.

A still further object of the invention is to provide a cutter which may be easily attached to and detached from the tractor or bulldozer with which it is used.

Another object of the invention is to provide a cutter which is of simple construction and which is sufficiently sturdy to withstand the task for which it is intended.

With the above more important objects in view, and such other objects as may become apparent as this specification proceeds, the invention consists essentially of the arrangement and construction of parts as illustrated in the accompanying drawings, in which—

Figure 1 is a plan view of the invention, showing the same in situ on a tractor.

Figure 2 is a front elevation thereof.

Figure 3 is a cross-sectional view, taken in the plane of the line 3—3 in Figure 2.

Figure 4 is an underside plan view of the carrier used to support the cutting blade, the same being taken in the direction of the arrow 4 in Figure 3.

Figure 5 is a cross-sectional view taken in the plane of the line 5—5 in Figure 2, and Figure 6 is a fragmentary, cross-sectional view taken in the plane of the line 6—6 in Figure 3.

Like characters of reference are used to designate like parts in the specification and throughout the several views.

Referring now to the accompanying drawings in detail, the invention is adapted for attachment to a track type tractor or a bulldozer 10, more particularly, to the framework 11 with which such bulldozers are customarily provided. This framework may be raised and lowered by means of suitable mechanism associated with the tractor, and the invention is secured to the front end of the framework, as is best illustrated in the accompanying Figure 1.

The invention consists of a pair of spaced side plates 12, configurated substantially as shown in the accompanying Figure 3, and each being provided with an angle bracket 13 which is secured thereto by means of the bolts 14.

The plates 12 extend forwardly and downwardly with respect to the framework 11 and a bulldozer 15, assuming the form of a flat plate, connects the forward extremities of the plates and extends partially along the length thereof. The remaining portion of these extremities is double chamfered to provide a sharp edge 16.

A U-shaped reinforcing channel 17 is welded or otherwise suitably secured between the plates 12, with the open side thereof being immediately adjacent to the rear surface of the bulldozer 15. A mounting bolt 18 is positioned centrally in the rear wall 19 of the channel and passes through a suitable aperture formed in the framework 11, wherein it is secured by means of the nut 20.

It will be noted that the brackets 13 are angulated so as to bear against the framework 11, and a projection 21 is also formed on each of the plates 12, the edge 22 of which bears against the underside of the framework.

Secured transversely between the lower ends of the plates 12 is a horizontal carrier designated by the general reference numeral 23, the same consisting of an arcuate frontal portion 24 and a flat top cross member 25. A plurality of reinforcing ribs 26 are provided on the undersurface of the cross member 25 to strengthen the portion 24, and the latter is also formed with a plurality of apertures 27. The apertures 27 are adapted to receive a plurality of bolts 28, whereby an arcuate cutting blade 29 is removably secured to the portion 24.

Having thus detailed the construction of the invention, its method of operation will now be presented.

When the tractor 10 moves forward in the direction of the arrow 30, the framework 11 together with the associated cutter is lowered so that the cutting blade 29 penetrates the ground and travels under the surface 31 thereof. The sharp edge 32 of the blade 29 will engage and sever the trees and shrubs which, after being separated from their roots, may pass freely between the side plates 12 and under the tractor.

The depth at which the blade 29 will cut under the ground surface 31 is of course, governed by the power of the tractor and by the character of the soil through which the cutter passes.

The blade may be elevated from the ground by simply raising the framework 11 and the cutter as a whole, may be readily detached from the tractor by removing the nut 20.

It will be noted that the sharp edges 16 will assist in the passage of the plates 12 through the ground and the cutting force of the blade 29 will be effectively strengthened by the edges 22 of the plate portion 21 bearing against the underside of the framework 11.

While in the foregoing there has been shown and described the preferred embodiment of this invention it is to be understood that minor changes in the details of construction, combination and arrangement of parts may be resorted to without departing from the spirit and scope of the invention as claimed.

What I claim as my invention is:

1. In association with a tractor having a bulldozing frame adapted to be lowered and raised, a pair of spaced side plates secured to the front ends of said framework and extending forwardly and downwardly therefrom, a bulldozer connecting the forward extremities of said plates partially along the length thereof, a sharp edge along the remaining portions of said extremities, a reinforcing channel between said plates and immediately adjacent to said bulldozer, a horizontal carrier connecting the lower ends of said plates, and an arcuate, horizontaly extending cutting blade detachably secured to said carrier, said blade engaging said trees below the surface of the ground.

2. In association with a tractor having a bulldozing frame adapted to be lowered and raised, an underground cutter for trees comprising, in combination, a pair of spaced side plates, an angle bracket on each of said side plates, said brackets bearing against the front of said framework, said plates extending forwardly and downwardly, a bulldozer secured to the forward extremities of said plates partially along the length thereof, the remaining portions of said extremities being double chamfered and defining a sharp edge, a U-shaped reinforcing channel secured between said plates with the open side thereof immediately adjacent to the rear surface of said bulldozer, a mounting bolt centrally positioned in the rear wall of said channel, said bolt passing through said framework and securing said cutter thereto, a horizontal carrier connecting the lower ends of said plates, an arcuate frontal portion at the forward end of said carrier and a flat top cross member, a plurality of ribs on the underside of said cross member adapted to reinforce said frontal portion, an arcuate blade, and a plurality of bolts attaching said blade to said frontal portion, said blade engaging said trees below the surface of the ground.

3. The device as defined in claim 2 together with a rearwardly protruding portion on each of said plates, said portions bearing against the underside of said framework.

WILLARD O. TAYLOR.

REFERENCES CITED

The following references are of record in the file of this patent:

UNITED STATES PATENTS

| Number | Name | Date |
|---|---|---|
| 2,295,458 | Edwards | Sept. 8, 1942 |